US012786484B2

(12) United States Patent
Lin et al.

(10) Patent No.: US 12,786,484 B2
(45) Date of Patent: Nov. 3, 2026

(54) LIVE BROADCAST DEVICE AND RELATED LIVE BROADCAST METHOD

(71) Applicant: Realtek Semiconductor Corp., HsinChu (TW)

(72) Inventors: Wei-Cheng Lin, HsinChu (TW); Jie Wang, Suzhou City (CN); Sung-Chen Yang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 71 days.

(21) Appl. No.: 18/817,243

(22) Filed: Aug. 28, 2024

(65) Prior Publication Data

US 2025/0175654 A1 May 29, 2025

(30) Foreign Application Priority Data

Nov. 28, 2023 (CN) ........................ 202311612385.2

(51) Int. Cl.
*H04N 21/2187* (2011.01)
*H04L 65/752* (2022.01)
*H04N 21/431* (2011.01)

(52) U.S. Cl.
CPC ....... *H04N 21/2187* (2013.01); *H04L 65/752* (2022.05); *H04N 21/4312* (2013.01)

(58) Field of Classification Search
CPC ........... H04N 21/2187; H04N 21/4312; H04N 21/44; H04N 21/462; H04N 21/478; H04L 65/752
See application file for complete search history.

(56) References Cited

U.S. PATENT DOCUMENTS

2019/0158723 A1* 5/2019 Isbell .................. H04N 23/661
2019/0261025 A1* 8/2019 Hussain ........... H04N 21/25891
2019/0273955 A1* 9/2019 Yu ........................ H04N 21/632
2019/0281327 A1* 9/2019 Li ...................... H04N 21/2393
2020/0344498 A1* 10/2020 Lazar ............... H04N 21/47202

FOREIGN PATENT DOCUMENTS

CN 106658205 B 9/2020

* cited by examiner

*Primary Examiner* — Phuoc H Nguyen
*Assistant Examiner* — Steven C Nguyen
(74) *Attorney, Agent, or Firm* — Winston Hsu

(57) ABSTRACT

A multi-platform live streaming device is provided. The multi-platform live streaming device includes: a user interface service module and a streaming output service module. The user interface service module is configured to control one or more image elements based on a user interface setting, thereby determining screen layouts of a local monitoring video and a live output video respectively. The streaming output service module is configured to encode the live output video to generate live streaming media and streaming the live streaming media simultaneously to multiple live streaming platforms. Specifically, the screen layout of the local monitoring video can differ from that of the live output video.

10 Claims, 7 Drawing Sheets

LIVE BROADCAST DEVICE AND RELATED LIVE BROADCAST METHOD

BACKGROUND OF THE INVENTION

1. Field of the Invention

The present invention relates to live broadcast/streaming technology, and more particularly to a live broadcasting/streaming device and related live broadcasting/streaming method with cross-platform synchronous live broadcasting/streaming capabilities and independent control of screen layout.

2. Description of the Prior Art

Advancements in data transmission over the internet and image encoding technologies have significantly fueled the growth of live streaming platforms. Today, live broadcasts/streaming of various styles and contents have become an integral part of modern entertainment. To cater to this trend, the market has introduced a range of software and hardware solutions designed for individual users to facilitate live streaming. These live streaming devices enable users to conveniently stream local video content to live streaming platforms in the form of streaming media for viewership. However, existing live streaming devices have several noticeable limitations. Firstly, existing live streaming devices do not support simultaneous multi-platform broadcasting/streaming. Live-streamers are unable to stream video content simultaneously to different live streaming platforms for cross-platform synchronous broadcasting. Additionally, existing live streaming devices lack dynamic bitrate adjustment capabilities. When network status fluctuates between the live streaming devices and the live streaming platform, they fail to automatically adjust the bitrate of the streaming media, thus compromising the viewer's experience. Furthermore, existing live streaming devices do not allow live-streamers to adjust the screen layout during a live streaming event. Once a live streaming event starts, the screen layout becomes fixed and cannot be modified in real-time according to the needs of the live-streamers or specific application scenario. Lastly, existing live streaming devices are unable to differentiate between local monitoring video and live output video. These live streaming devices limit the content of the monitoring video and the live output video to be identical, lacking adaptability to different scenes or requirements. From the above, it is evident that the existing live streaming devices have numerous areas that urgently need improvement.

SUMMARY OF THE INVENTION

In light of above, it is one of objectives of the present invention to provide a novel live streaming device and method. The live streaming device and method of the present invention are characterized by the following features. Firstly, the present invention allows for direct interfacing with multiple live streaming platforms without the need for third-party cloud service platforms. It enables simultaneous transmission of live streaming media to multiple live streaming platforms, thereby facilitating cross-platform synchronous broadcasting/streaming and featuring dynamic bit-rate adjustment for streaming media. Furthermore, the live streaming device and method of the present invention support real-time adjustments to screen layouts. Even after a live streaming event has commenced and the live streaming media is being streamed to the live streaming platforms, users retain the ability to modify the screen layout at any moment. In addition, the present invention also supports independent control of screen layouts, allowing users to employ multiple screen layouts for local monitoring and live output.

According to one embodiment, a multi-platform live streaming device is provided. The multi-platform live streaming device comprises: a user interface service module and a streaming output service module. The user interface service module is configured to control one or more image elements based on a user interface setting, thereby determining screen layouts of a local monitoring video and a live output video respectively. The streaming output service module is configured to encode the live output video to generate live streaming media and streaming the live streaming media simultaneously to multiple live streaming platforms. Specifically, the screen layout of the local monitoring video can differ from that of the live output video.

According to one embodiment, a multi-platform live streaming method is provided. The multi-platform live streaming method comprises: controlling one or more image elements based on a user interface setting, thereby determining screen layouts of a local monitoring video and a live output video respectively; and encoding the live output video to generate live streaming media and streaming the live streaming media simultaneously to multiple live streaming platforms. Specifically, the screen layout of the local monitoring video can differ from that of the live output video.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1A:
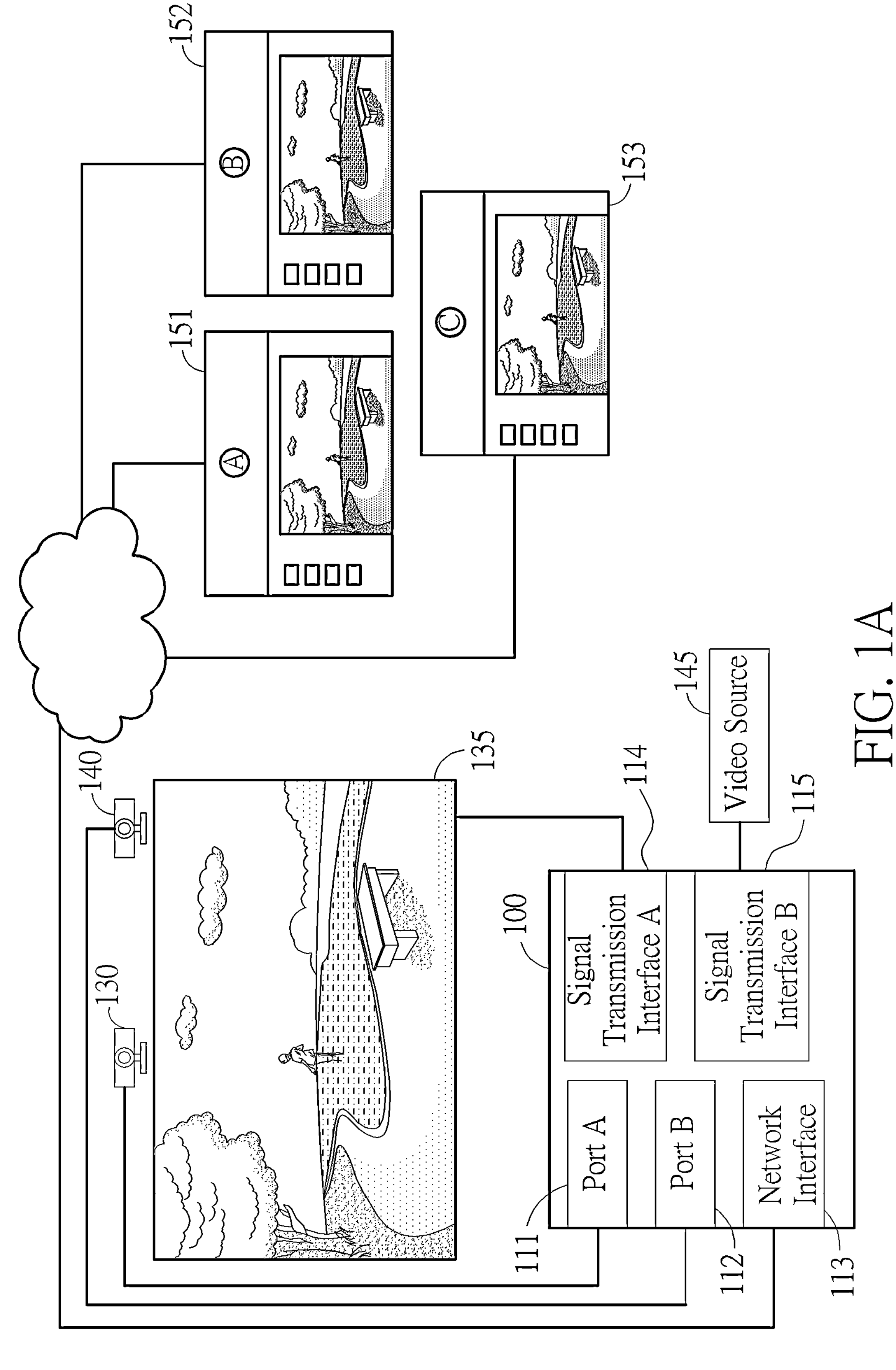
FIG. 1A illustrates an application example of a live streaming device according to one embodiment of the present invention.

Please refer to FIG. 1A, which illustrates an application example of a live streaming/broadcasting device according to one embodiment of the present invention. As depicted, a live streaming device 100 is utilized to generate live streaming/broadcasting content for a streamer or a broadcaster. Utilizing specific transmission protocols, such as various types of real-time messaging protocol (RTMP) and its variants (such as RIMPS, RTMPE, RTMPT, RTMFP), or HTTP live streaming (HLS), MPEG-DASH, and so on, the live streaming device 100 simultaneously transmits live streaming media containing live streaming/broadcasting content to multiple live streaming platforms, such as platform A, platform B, and platform C. The live streaming media is then redistributed through platforms A, B, and C to different viewer devices, such as remote playback devices A (151), B (152), and C (153).

The live streaming device 100 may comprise ports A (111) and B (112), a network interface 113, signal transmission interfaces A (114), and B (115). The ports A (111) and B (112) are coupled respectively to image capturing devices 130 and 140 (e.g., cameras with video or image sequence output capabilities), incorporating captured images or videos from the cameras 130 and 140 as part of the live streaming/broadcasting content. In one embodiment, the ports A (111) and B (112) can be ports compliant with Universal Serial Bus (USB) standard. The signal transmission interface A (114) can be coupled to a display device 135 to display a local monitoring video produced by the live streaming device 100 for the streamer/broadcaster to view the current live streaming/broadcasting content, where the signal transmission interface A (114) may be a V-by-One interface. The signal transmission interface B (115) can be coupled to a video source 145 to utilize videos or images outputted by the video source 145 as base videos or images for the live streaming/broadcasting content, where the signal transmission interface B (115) can be a High Definition Multimedia Interface (HDMI) or a DisplayPort (DP). In one embodiment, the video source 145 can be a personal computer, mobile phone, tablet, game console, etc. The network interface 113 is coupled to the internet and to encode a live output video produced locally by live streaming device 100 into live streaming media, and then sends the live streaming media to platforms A, B, and C via real-time messaging protocols.

Figure 1B:
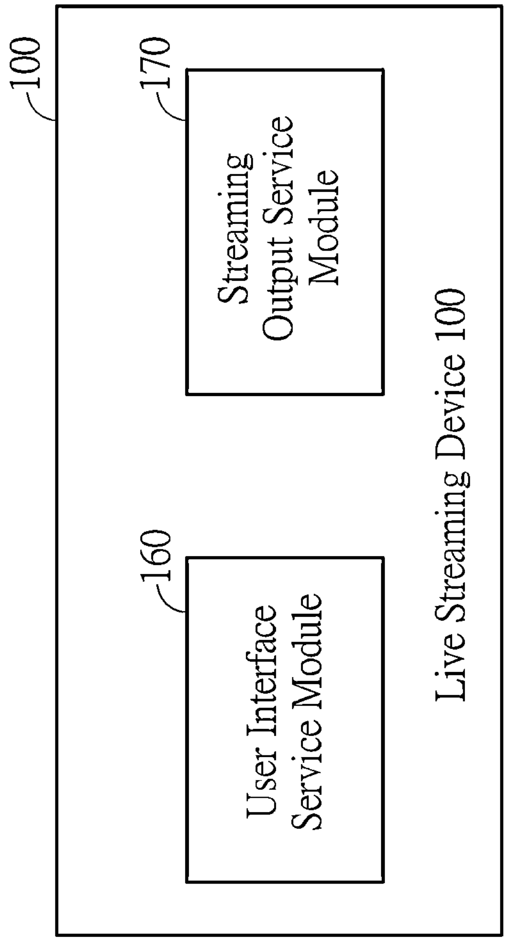
FIG. 1B illustrates service layer architecture of a live streaming device according to one embodiment of the present invention.

FIG. 1B illustrates service layer architecture of the live streaming device 100 according to one embodiment of the present invention. As shown in the figure, the live streaming device 100 includes a user interface service module 160 and a streaming output service module 170. The user interface service module 160 is configured to (but not limited to) control one or more image elements based on a user interface setting, thereby independently and respectively determining screen layouts of a local monitoring video and a live output video such that the screen layouts of the local monitoring video and the live output video can be independently controlled. Moreover, the streaming output service module 170 is configured to (but not limited to) encode the live output video to generate a live streaming media, and then simultaneously stream the live streaming media to multiple live streaming platforms such as platform A, platform B, and platform C. The streaming output service module 170 can dynamically change a bit rate used in encoding the live output video based on network connection status with platforms A, B, and C, as reported through the network interface 113.

Figure 2A:
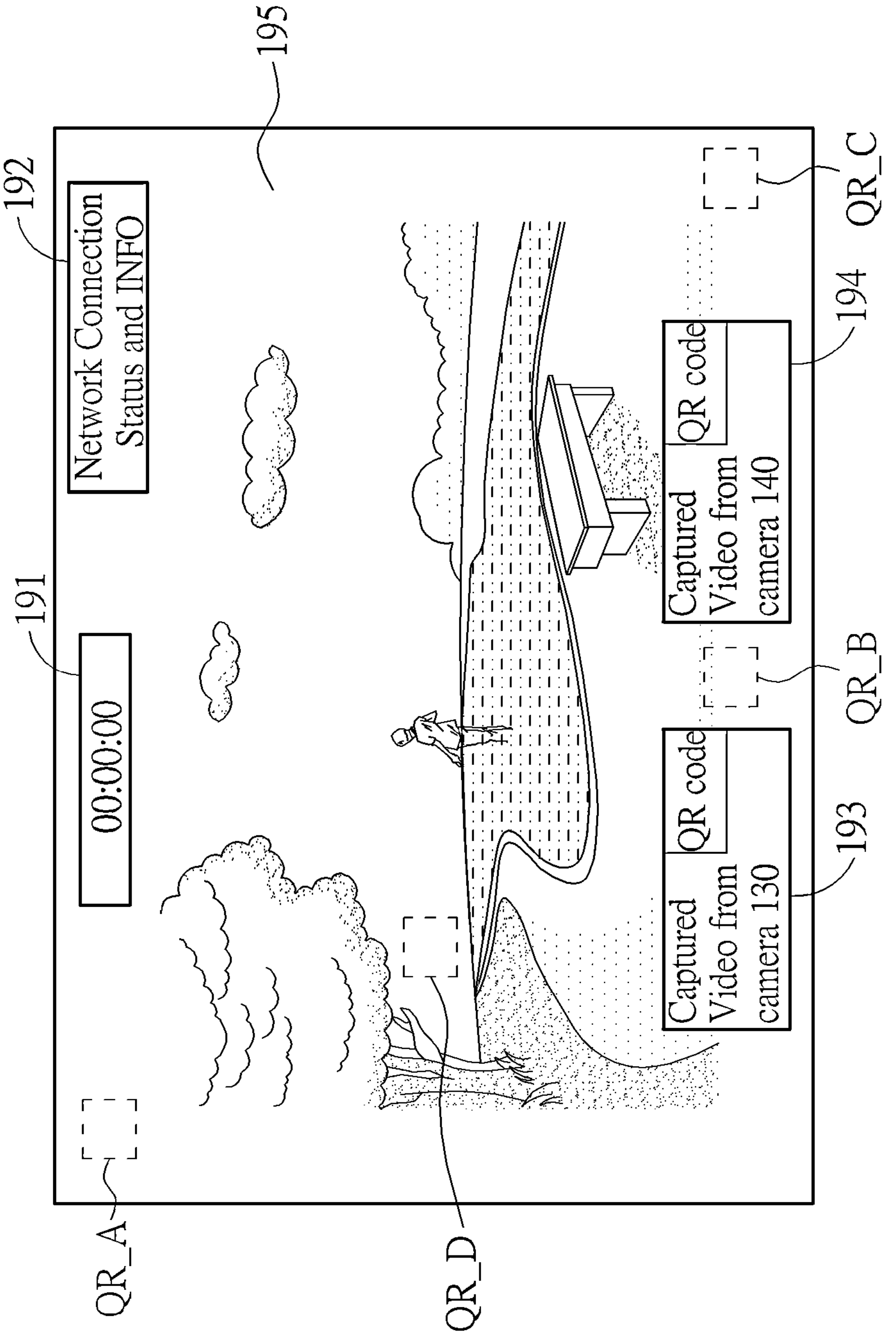
FIG. 2A illustrates how a user interface service module controls screen layouts of a local monitoring video and a live output video according to one embodiment of the present invention.

FIG. 2A illustrates how the user interface service module 160 controls the screen layouts of the local monitoring video and the live output video according to one embodiment of the present invention. In this embodiment, the screen layout is comprised of image elements 191-195. The image element 191 is utilized to display a timer user interface (UI) showing an elapsed time of a current live streaming/broadcasting event. The image element 192 is utilized to display a network connection status UI, showing current network connection status between the live streaming device 100 and platforms A, B, and C, such as delay time, connection status, and/or connection speed. The image elements 193 and 194 are is utilized to display captured videos or images outputted by the cameras 130 and 140, respectively. In one embodiment, the image elements 193 or 194 can also show a quick response code (QR Code) while showing the captured videos or images from the cameras 130 and 140, thereby providing information about the current live streaming/broadcasting event (e.g., a URL) to viewers. The bottom-most image element 195 is utilized to display base videos or images outputted by the video source 145, serving as fundamental content for the live streaming/broadcasting. It is worth noting that the position of the QR Code, besides being set around corners of image elements 193 and 194, can also be set at any position in the screen layout, such as at the top of the screen layout like QR_A, or at the bottom of the screen layout like QR_B, at any corner of the screen layout like QR_C, or even at any central position of the screen layout like QR_D. Furthermore, the user interface service module 160 can independently control transparency, position, size, and/or Z-axis position (i.e., a stacking order or occlusion relationship between image elements) of each of the image elements 191-195 in both the local monitoring video and the live output video, based on user interface setting data, thus allowing different screen layouts for the local monitoring video and the live output video.

Please note that types and quantities of the image elements 191-195 mentioned in the aforementioned embodiment are not limitations of the present invention. In some embodiments, the screen layouts of the local monitoring video and the live output video may include more or fewer image elements, as well as image elements different from those shown in FIG. 2A. For instance, image elements could also display UIs indicating status information in addition to the timer UI and network connection status UI, or cursors/pointers of controllers (such as a mouse). Moreover, the size and the position of these image elements might differ from those in the embodiment shown of FIG. 2A.

Figure 2B:
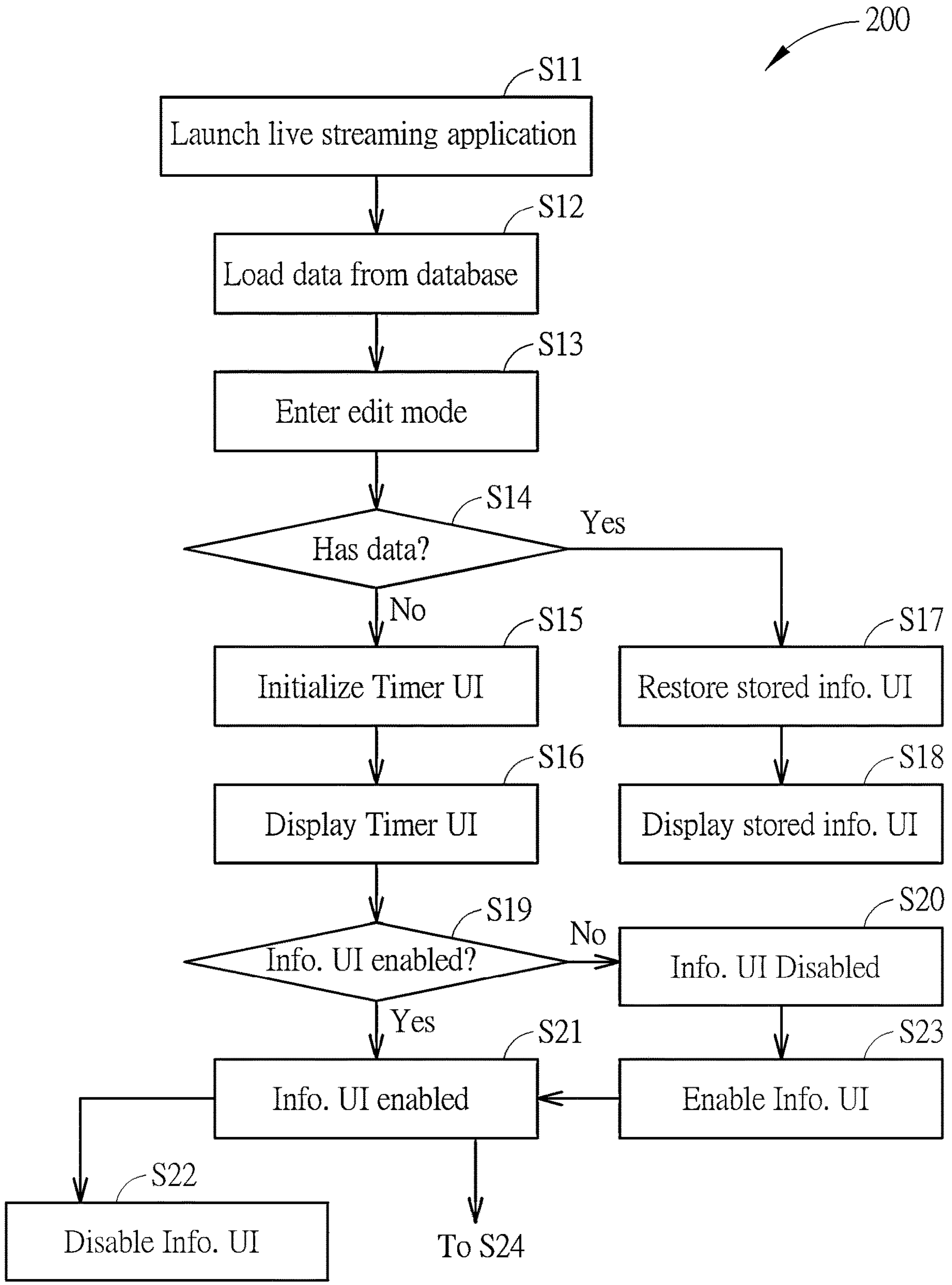
FIG. 2B and FIG. 2C illustrate collaborative operational flowcharts of a user interface service module and a streaming output service module according to one embodiment of the present invention.
Figure 2C:
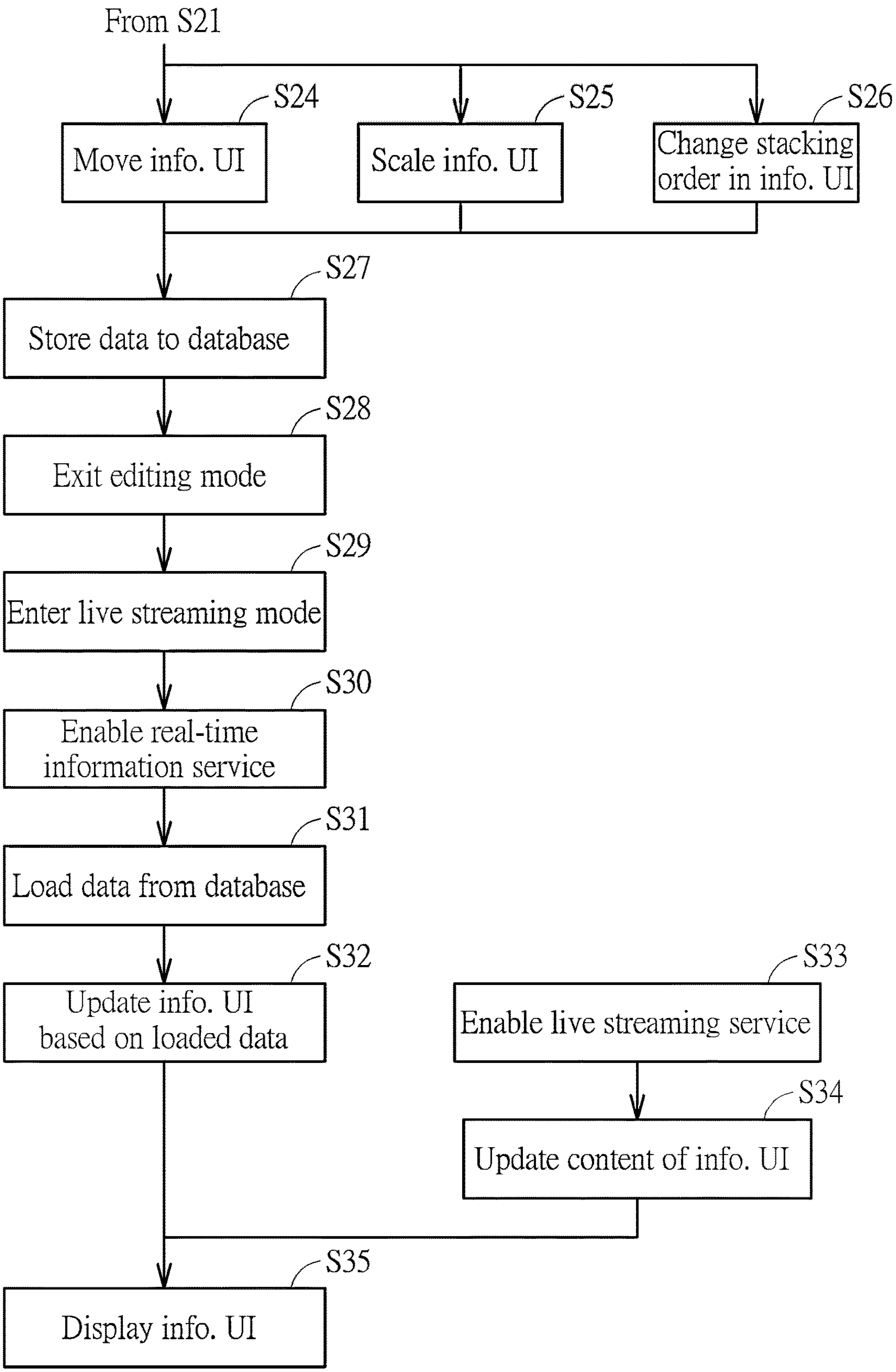

FIG. 2B and FIG. 2C further illustrate collaborative operational flowcharts of the user interface service module 160 and the streaming output service module 170 according to one embodiment of the present invention. Initially, at step S11, a live streaming/broadcasting application corresponding to the live streaming device 100 is launched. At step S12, user interface setting data is loaded from a database of the live streaming device 100. At step S13, an editing mode provided by the user interface service module 160 is entered, where the editing mode is used for editing the screen layout of the local monitoring video and the live output video. At step S14, it is determined whether the database has the user interface setting data; if not, the flow proceeds to step S15; if yes, the flow proceeds to step S17. At step S15, an image element for displaying the timer UI is initialized. At step S16, the image element for displaying the timer UI is displayed. On the other hand, if the database has the user interface setting data, then at step S17, stored information UI is restored based on the user interface setting data, and the stored information UI is displayed at step S18. Please note that the information UI mentioned here and below can refer to any combination of various UIs displayed in any of the image elements in the aforementioned screen layout, including but not limited to: the timer UI, network connection status UI, status information UI, cursors or pointers of controllers, captured videos or images outputted by the cameras 130 and 140, and the base videos or images outputted by the video source 145.

At step S19, it is determined whether the information UI has been enabled; if not, the flow proceeds to step S20; if yes, it goes to step S21. At step S20, as the information UI is disabled, it can be enabled at step U23. On the other hand, at step S21, since the information UI is already enabled, the flow may proceed to a next step, or to enter step S22 to disable the information UI. When the information UI is enabled, steps S24, S25, or S26 allows the stream or the broadcaster to adjust individual image elements in the information UI, including movement of individual image elements (position adjustment), scaling of individual image elements (size adjustment), and Z-axis positions of individual image elements (a stacking order/occlusion relationship) according to their needs and operations. Once adjustments to the information UI are completed, relevant parameters are saved as new user interface setting data or utilized to update existing user interface setting data in the database (at step S27). At steps S28 and S29 the editing mode is exited and a live streaming/broadcasting mode is entered. At step S30, real-time information service provided by the user interface service module 160 is enabled (i.e., displaying the information UI in the local monitoring video or the live output video). At step S31, previously set user interface setting data is loaded from the database. At step S32, composition and display settings of the information UI are updated based on the loaded user interface setting data. At step S33, a streaming service provided by the streaming output service module 170 starts, outputting the local monitoring video to the local display device 135 and encoding the streaming output video into the live streaming media for being streamed to live streaming platforms. At step S34, the composition and display settings of the information UI are updated. At this step, since the network connection status UI in the information UI (if present) needs to display real-time network connection information, and the streamer or the broadcaster might adjust the information UI during the live streaming/broadcasting (e.g., hiding specific image elements, or adjusting transparency, sizes, positions, and Z-axis positions of specific image elements), the composition and display settings of the information UI need to be continuously updated after the start of the live streaming/broadcasting event. Finally, at step S35, the information UI is displayed in the local monitoring video or the live output video based on the updated composition and display settings.

Figure 3:
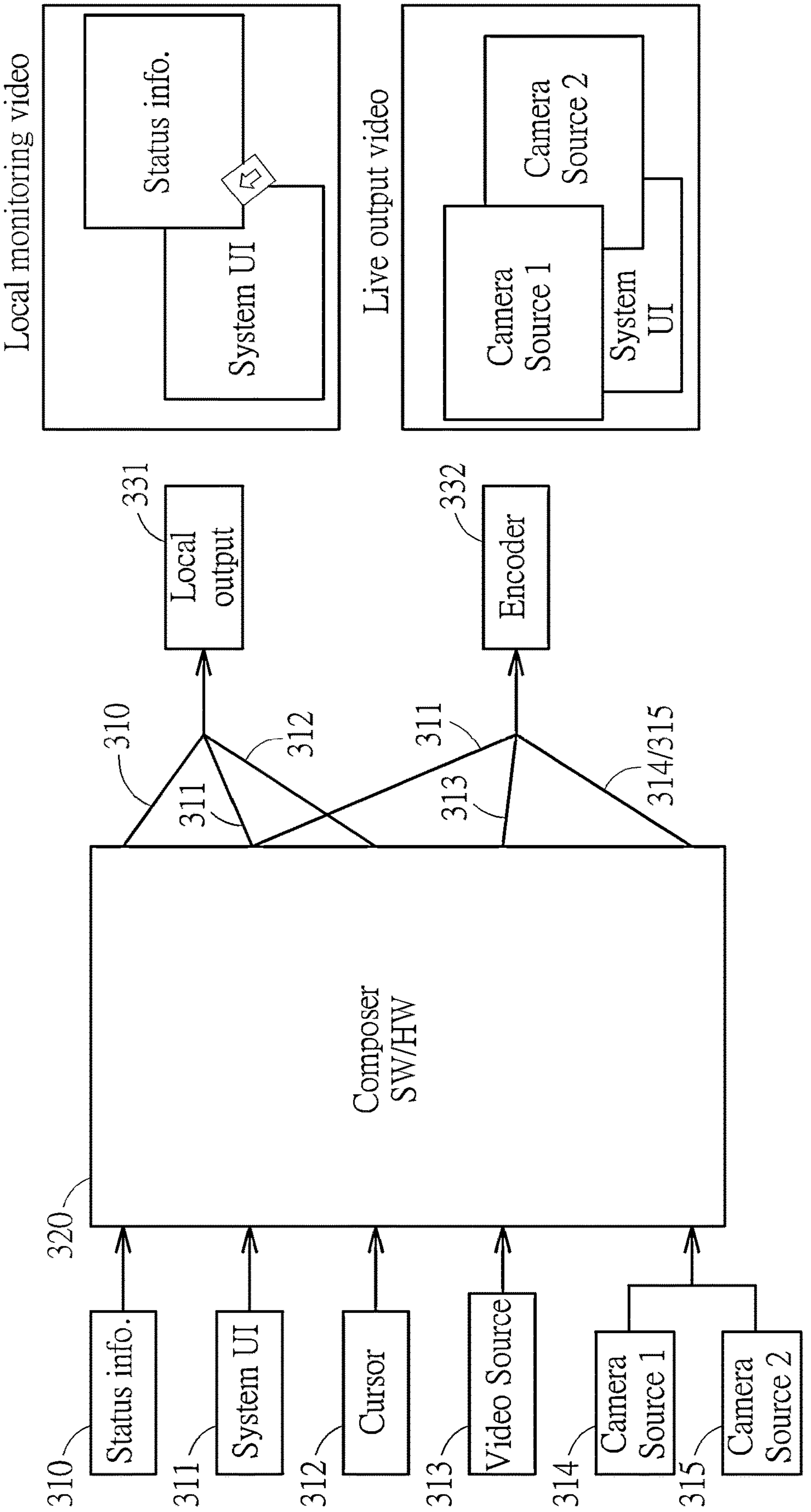
FIG. 3 illustrates architecture of a user interface service module and the streaming output service module according to one embodiment of the present invention.

In the present invention, the user interface service module 160 enables the screen layout of the local monitoring video to differ from that of the live output video. Therefore, this needs an architecture that allows independent control of image elements. Please refer to FIG. 3, which illustrates architecture of the user interface service module 160 and the streaming output service module 170. A composer 320, which can be implemented based on software or hardware, is utilized to control displaying or hiding of different image elements provided by status information 310, a system UI 311, a cursor 312, a video source 313 and camera sources 314 and 314 and accordingly control blending/mixing of the image elements provided by the status information 310, the system UI 311, the cursor 312, the video source 313 and the camera sources 314 and 314, thereby generating the local monitoring video and live output video, respectively. Furthermore, the local monitoring video is provided through a local output 331 to the signal transmission interface A (114) as shown in FIG. 1A and is transmitted to the display device 135 for displaying. The live output video is encoded by an encoder 332 to generate the live streaming media, then provided to the network interface 113 as shown in FIG. 1A, and transmitted to the live streaming platforms.

Further, the status information 310 provides transparency information, size information, position information, and actual content information of various status information UIs to be displayed (including: timer UI, network connection status UI) to the composer 320 for rendering related graphics. The system UI 311 provides UI information regarding an underlying operating system to the composer 320 for rendering the related graphics. The cursor 312 provides position information of the cursor to the composer 320 for rendering related graphics. The video source 313 provides base videos or images to the composer 320. The camera sources 314 and 314 provide captured videos or images to the composer 320. Furthermore, the composer 320, based on Z-axis positions corresponding to each image element, blend or mix the render graphics with a correct stacking order or occlusion relationships, thereby rendering the local monitoring video and live output video. The composer 320 can also decide whether to display or hide the render graphics. Thus, the local monitoring video and live output video can have different screen layouts. For example, the streamer or the broadcaster can control to display certain image elements in the local monitoring video but not in the live output video, or vice versa. Additionally, the streamer or the broadcaster can, during the live streaming/broadcasting event, automatically or manually hide specific image elements already displayed in the local monitoring video or live output video, thereby dynamically changing the screen layout in real-time.

Figure 4:
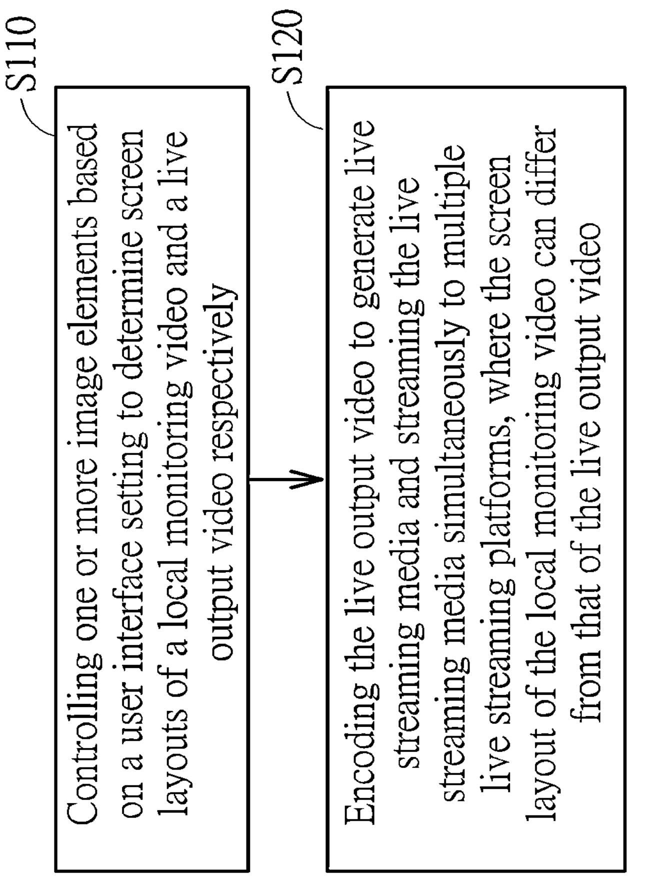
FIG. 4 illustrates a flow chart of a live streaming method according to one embodiment of the present invention.

Based on the above descriptions, FIG. 4 illustrates a simplified flow of a live streaming method according to one embodiment of the present invention. As shown, the simplified flow includes the following steps:

Step S110: controlling one or more image elements based on a user interface setting to determine screen layouts of a local monitoring video and a live output video respectively; and Step S120: encoding the live output video to generate live streaming media and streaming the live streaming media simultaneously to multiple live streaming platforms, where the screen layout of the local monitoring video can differ from that of the live output video.

The principles and specific details of the above steps have been thoroughly explained through previous embodiments and are not reiterated here. It should be noted that the aforementioned flow can be enhanced by adding additional steps or through appropriate modifications and adjustments to better achieve the generation and streaming of the live output video, thereby obtaining an improved live broadcasting/streaming experience.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-platform live streaming device, comprising:

a processor in communication with a memory storing instructions that when executed by the processor, provide:

a user interface service module configured to control a plurality of image elements based on a user interface setting, thereby determining screen layouts of a local monitoring video and a live output video respectively, comprising:

a composer to render graphics corresponding to the plurality of image elements; and to separately generate, based on respective portions or all of the rendered graphics, the local monitoring video for local display and the live output video for streaming, wherein at least one of the rendered graphics is displayed in one of the local monitoring video and the live output video and is hidden in the other one of the local monitoring video and the live output video, wherein the plurality of image elements are utilized to display the captured video or image and a quick response code (QR code) associated with a live streaming/broadcasting event that the live output video corresponds to; and a streaming output service module configured to encode the live output video to generate live streaming media and streaming the live streaming media simultaneously to multiple live streaming platforms;

wherein the screen layout of the local monitoring video can differ from that of the live output video;

wherein while the live streaming media is being streamed to the plurality of live streaming platforms, update composition and display settings of at least one of the plurality of image elements to change a screen layout of at least the live output video.

2. The live streaming device of claim 1, wherein while the streaming output service module is streaming the live streaming media to the multiple live streaming platforms, the user interface service module is configured to adjust the screen layout of the live output video based on a modified user interface setting.

3. The live streaming device of claim 1, wherein the user interface service module is configured to determine and control transparency, position, size, and/or Z-axis position of the plurality of image elements based on the user interface setting.

4. The live streaming device of claim 1, wherein the plurality of image elements are utilized to display one or more of a timer user interface, a network connection status user interface, a status information user interface, a cursor or a pointer of a controller, a captured video or image outputted by an image capturing device, and a base video or image outputted by a video source.

5. The live streaming device of claim 1, wherein the streaming output service module is configured to change a bit rate corresponding to the live streaming media based on a network connection status between the live streaming device and one of the multiple live streaming platforms.

6. A multi-platform live streaming method, comprising:

controlling a plurality of image elements based on a user interface setting, thereby determining screen layouts of a local monitoring video and a live output video respectively, comprising:

utilizing a composer to render graphics corresponding to a plurality of image elements; and to separately generate, based on respective portions or all of the rendered graphics, the local monitoring video for local display and the live output video for streaming, wherein at least one of the rendered graphics is displayed in one of the local monitoring video and the live output video and is hidden in the other one of the local monitoring video and the live output video, wherein the plurality of image elements are utilized to display the captured video or image and a quick response code (QR code) associated with a live streaming/broadcasting event that the live output video corresponds to; and encoding the live output video to generate live streaming media and streaming the live streaming media simultaneously to multiple live streaming platforms;

wherein the screen layout of the local monitoring video can differ from that of the live output video;

wherein while the live streaming media is being streamed to the plurality of live streaming platforms, update composition and display settings of at least one of the plurality of image elements to change a screen layout of at least the live output video.

7. The live streaming method of claim 6, further comprising:

modifying the user setting; and while the live streaming media is being streamed to the multiple live streaming platforms, adjusting the screen layout of the live output video based on the modified user interface setting.

8. The live streaming method of claim 6, wherein the step of controlling the plurality of image elements based on the user interface setting comprises:

determining and controlling transparency, position, size, and/or Z-axis position of the plurality of image elements based on the user interface setting.

9. The live streaming method of claim 6, wherein the plurality of image elements are utilized to display one or more of a timer user interface, a network connection status user interface, a status information user interface, a cursor or a pointer of a controller, a captured video or image outputted by an image capturing device, and a base video or image outputted by a video source.

10. The live streaming method of claim 6, further comprising:

changing a bitrate corresponding to the live streaming media based on a network connection status corresponding to one of the multiple live streaming platforms.

* * * * *